EQUIPMENT FOR SELECTIVELY PLAYING RECORDS

Filed March 1, 1954

Inventor:
Werner Zorn

United States Patent Office 2,925,475

Patented Feb. 16, 1960

2,925,475

EQUIPMENT FOR SELECTIVELY PLAYING RECORDS

Werner Zorn, Berlin-Zehlendorf-West, Germany, assignor to Loewe Opta Aktiengesellschaft, Berlin-Steglitz, Germany, a company of Germany Application March 1, 1954, Serial No. 412,990

Claims priority, application Germany March 6, 1953

5 Claims. (Cl. 179—100.2)

Figures 1, 2:
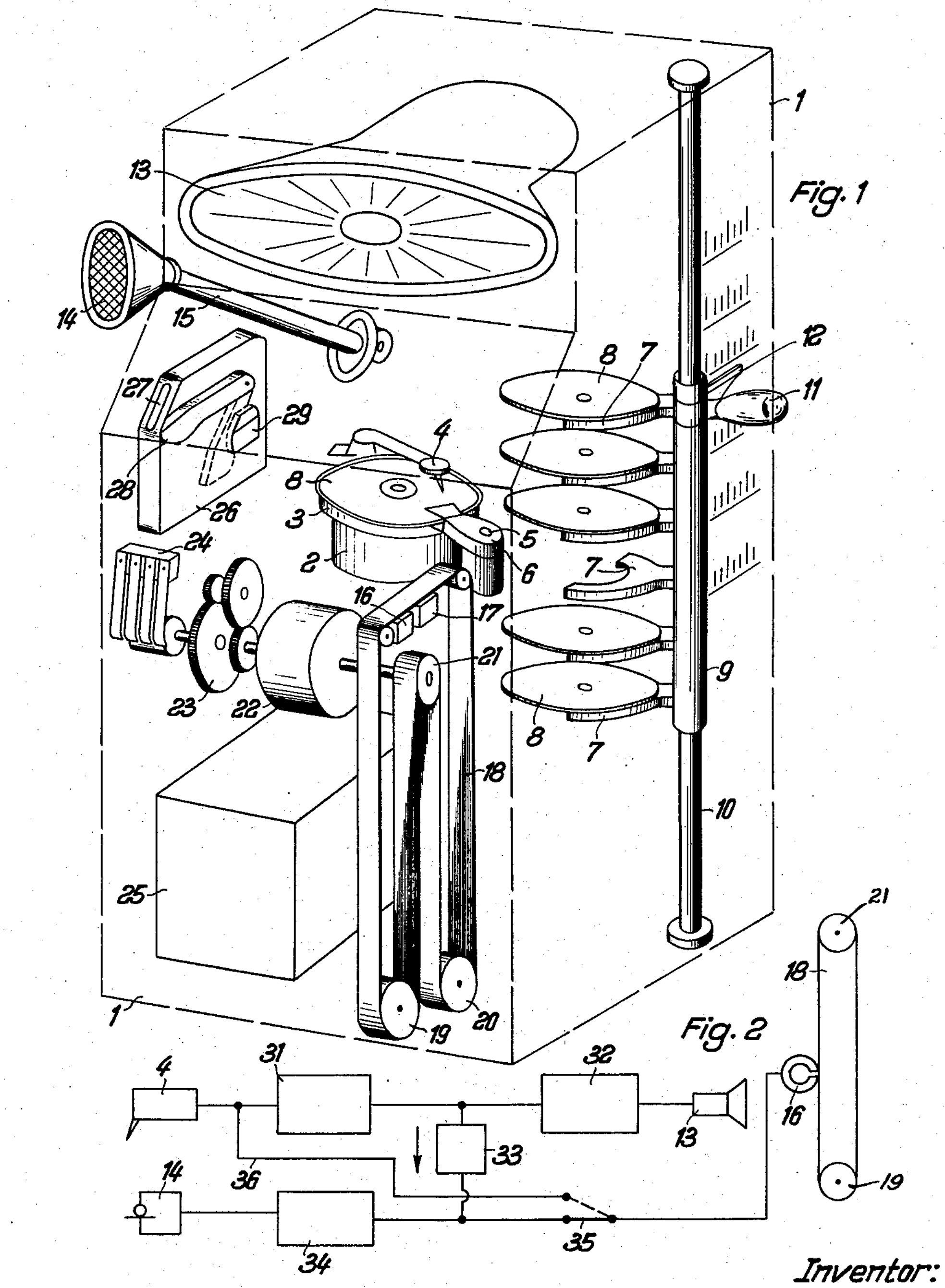

Devices for selectively playing records are known, particularly in the shape of music automats ("juke-boxes"). These sets have a magazine, as large as possible, of various records, from which by means of a knob on the outside, connected with a list of the contents, any desired record can be selected and placed, preferably in a fully automatic manner, on the turntable in the inside of the equipment. There are numerous devices of this kind in the form of coin controlled automats, installed in restaurants, entertainment sites, etc. In connections with devices of this kind, designed for reproducing recorded music—regardless of whether they are in the shape of an automat or not—there frequently arises the desire to be able to reproduce automatically, in addition to the stock of records offered, material performed by the person using the equipment himself. The most frequent case of this kind is that where a vocal line is to be inserted on recorded music, for example, the text accompaniment of a folk-song or hit song. Other possible cases are the addition of a musical accompaniment to a spoken record, or again, the addition of explanatory or descriptive texts to records with a musical or other content, particularly an instructive content. Up till now no devices have been known which make it possible to supplement records with a definite content by means of a spoken or other acoustic performance on the part of the person using the equipment himself.

It is the object of the present invention to solve this task, and the present invention shows a practical embodiment for performing this task. This solution consists in the fact that a record-reproducing device, particularly one acting as an automat, is connected with an additional device for the magnetic sound recording and reproduction, and that, simultaneous with the reproduction of a record it permits the recording of it on a magnetic sound carrier together with the additional acoustic accompaniment spoken into a microphone. After this recording process is finished, the magnetic sound carrier alone—without it being necessary to play the record at the same time—can be played, and it then reproduces, in addition to the original performance of the record, the acoustical accompaniment performed via the microphone by the person using the equipment.

The magnetic sound carrier, which, in accordance with the invention is used in connection with a record-playing device, is preferably designed as an endless tape or endless wire, and its length is so fixed that the duration of its recording and reproducing time corresponds to that of a normal record. In this way it is not necessary, as would be the case with the ordinary spool arrangement, to rewind the magnetic sound carrier after the recording is completed; the driving motor for the sound carrier can, after the recording process is completed, continue to move in the same direction and thus, shortly after the recording process is ended, leads the sound carrier back to its initial point, from where the reproduction of the recorded performance can now begin.

Further details of the invention, as well as the principle of the invention, are explained more fully in the annexed two figures of the drawing. Fig. 1 represents an essentially schematic picture of the entire equipment, which however only shows the parts needed in order to understand the invention, and in a substantially simplified form; the remaining parts, in particular the wiring, the amplification system and the details of automatic setting have, in order to afford a clearer picture, been omitted. Fig. 2 represents a block diagram of the electric circuit and shows in particular the arrangement of the individual amplification stages and the electrical connections between the record reproducing channel and the recording channel for the magnetic sound carrier.

In Fig. 1 only the outer housing of the entire equipment represented is shown by dotted lines, and the parts inside the set which must be shown have been directly drawn, leaving out the construction parts which in this connection are superfluous, such as holding-devices, chassis, etc.

The housing 1 contains firstly as basic component the record-reproducing device, consisting of the following individual parts: A motor 2 carries on its upper front side in the familiar manner, a turntable 3, over which glides a pick-up 4 attached to a tone arm. At the edge of the turntable there is a gripping device 6, here represented in simplified form, which can be turned around an axle 5 and which, when the equipment is put into operation—either by hand or motor power—takes out of the record holding device 7, 9, 10 a record 8, in order to place it on the turntable 3. Such devices are known in principle, as so-called multiple record players. In the present example such a multiple record player is represented in a particularly simple manner, namely in that a shaft 10 passing through the inside of the housing is provided, on which there is an oblong cylindrical sleeve 9. On this sleeve 9, at minimum possible intervals, are located a large number of individual holders 7 for the records 8. These holders are similarly only schematically presented; in fact they are, in the well-known manner, provided with special fastening-clamps or springs, in order to guard the records against slipping out. In addition one must remember that in reality a very large number of individual record holders, of the order of magnitude of about 50 units, are provided, whereas for simplicity's sake Fig. 1 shows only six such holders. The sleeve 9, which can be moved up and down the shaft 10, is provided with a handle 11 that can be manipulated from the outside, and which carries an indicator 12 which is also visible from the outside. This indicator 12 glides, for example, on a vertical scale attached to the outer wall of the housing; this scale bears the individual written details about the contents of the records. In the example shown, the sleeve 9 is adjusted at such a height that the gripping device 6, which can be turned around the axle 5, has taken hold of a record and transported it to the turntable 3; the record was on (reckoned from the bottom upwards) the third holder 7. This record, after the gripping device 6 has been released and preferably automatically, the pickup 4 has been brought into position and the electrical reproducing device has been switched on, can be heard from the loudspeaker 13.

The actual idea of the invention is now realized in the following parts of the set: On the service wall of housing 1 of the set, easily accessible to the person using the equipment, there is a microphone 14, which most suitably is located on a support 15, which is placed in the inside of the housing or on its front wall, for example in a ball and socket joint.

Electrically connected with this microphone 14 is a magnetic transducer head 16 which is—in the usual way, directly next to an erasing head 17—in a magnetic sound recording and reproducing device. As part of this magnetic device there is, for example, an endless loop recording medium 18, which is led over two guide pulleys 19 and 20 and is put into motion by a pulley 21. This pulley is connected with the shaft of a motor 22, directly or by way of a transmission gear. In turn this motor 22 is connected by way of a transmission gear 23 with a switch, which in the well-known manner is so constructed and arranged that after the completion of the recording process there is an automatic switch to reproducing. The sound recording device, especially the magnetic head 16, is in accordance with the invention electrically connected with the record reproduction channel, which is between the pickup 4 and the loudspeaker 13, in such a way that the contents of the record are also recorded on the magnetic sound carrier 18. Thus, on the magnetic sound carrier first the content of the record 8 on the turntable and secondly the material spoken, sung, or otherwise acoustically played are recorded, and after the recording process is over can be played in such a way that the magnetic head 16 acts as a listening head and the recording currents fed into it are carried further, over the amplification device, to the loudspeaker 13.

The amplification device is located in the housing 1 at a suitable place, such as for example at 25.

If the set is to be used as a coin-controlled automat, for which purpose it is primarily designed, a coin-controlled switch 27, of the usual design and in the present example also only schematically suggested, is provided. Behind it there is a tipping cup 28 which, when a coin is inserted, changes its position and moves against a switching device or a relay 29, from which point the various switching steps now take place.

Among these steps are, primarily, the operation of the record gripper 6 after the record-holder 9, 10 has been properly adjusted, then the switching-on of the record motor 2, the placing of the pickup 4 and finally the switching-in of the electrical amplification channel between this pickup 4 and the loudspeaker 13. Simultaneously with these steps, the sound-recording device 15 to 22 is switched in to the circuit. In this connection, a special switching device can be provided on the housing, by means of which the person using the set can, as he chooses, either simply play the record or, combined with this, carry out a magnetic tone recording of the record and of an accompanying acoustical performance fed simultaneously into the microphone 14.

The wiring diagram in Fig. 2 shows the two main electrical channels of the equipment in a block presentation: There is an amplifier 31 on the pickup 4, and behind this a second final amplifier 32, the outlet of which leads to the loudspeaker 13; before the final amplifier 32 a line branches off containing an amplifier 33, the outlet of which affects the recording head 16 of the magnetic tape device. In addition, this magnetic head 16 is connected with the microphone 14 by way of a pre-amplifier 34. A switch 35 is provided between the amplifier 34 and the magnetic head 16, which, either by hand or occurring automatically with the other switching steps, can be adjusted to magnetic sound recording or reproduction.

When the switch 35 is set as indicated by the solid line, it is set at "magnetic sound recording." When it is at the position shown by the dotted lines, it is set at "reproduction," in which case the magnetic head 16 is connected by way of the line 36 directly to the record reproducing channel between the pickup 4 and the loudspeaker 14. It is most suitable for the electrical connection circuit that this line 36 is connected to the channel arranged between the elements 4 and 13 at a point lying before the input of the pre-amplifier 31, as from there it can be assumed that the control voltages supplied by the magnetic head 16 are of approximately the same order of magnitude as the control voltages supplied by the pickup 4. Furthermore, for purposes of reproduction the amplifiers 33 and 34 are put out of operation, which can also take place automatically through the multiple switch 24 shown in Fig. 1. During reproduction, only the magnetic head 16 is connected with the loudspeaker 13 by way of the amplification line 31, 32.

The amplifier 33, which is electrically connected between the record reproduction channel 4/13 and the magnetic pickup channel 14/16, has primarily the task of preventing a part of the control voltages generated by the microphone 14 from getting into the loudspeaker 13, which can easily lead to the appearance of electrical-acoustical retroaction and thus create a wobbled frequency.

In both circuits, i.e. in the reproduction circuit between the pickup and the loudspeaker as well as in the recording circuit between the microphone and the magnetic tape, customary regulating devices are provided for setting the volume.

Finally, the idea of the invention is not necessarily limited to the use of records for the reproduction and magnetic tape for the recording, although this is undoubtedly an especially advantageous solution. If necessary, the reproducing device as sound carrier can, instead of records, use some other recording-carrier in the form of records, rolls, tape or wire, working according to a mechanical, magnetic, or, in some cases, static principle.

What I claim is:

1. A music automat for selectively electrically playing disc records containing a pick-up, a reproducing amplifier, the input of which is connected with said pick-up, at least one loudspeaker connected with the output of said reproducing amplifier, at least one microphone arranged on the housing of said automat, an amplifier, the input of which is connected with said microphone, a magnetic tape, a driving motor for said magnetic tape, a magnetic recording head connected with the output of said amplifier and cooperating with said magnetic tape, switching means for simultaneously connecting said pick-up and said microphone with said magnetic recording head, a magnetic reproducing head cooperating with said magnetic tape, and switching means for connecting said reproducing head with said loudspeaker.

2. A music automat according to claim 1, in which said magnetic tape is designed as an endless tape.

3. A music automat according to claim 2, containing one magnetic head which serves as a combined recording and reproducing head.

4. A music automat according to claim 3, in which said switching means consist in a switch adapted to perform two positions, in one of which said magnetic combined head is connected with the output of said amplifier, the input of which is connected with said microphone, and in the other position of which said magnetic combined head is connected with the input of said reproducing amplifier, and which contains an amplifier, the input of which is electrically connected with an electric line connecting said pick-up with said loudspeaker, and the output of which is electrically connected with an electric line connecting said microphone with said combined magnetic head.

5. A music automat according to claim 1, containing a magnetic erasing head adapted to erase a magnetic record on said tape if a new record is effected.

References Cited in the file of this patent

UNITED STATES PATENTS

| | | |
|---|---|---|
| Re. 23,112 | Squire | May 10, 1949 |
| 2,087,581 | Ross | July 20, 1937 |
| 2,105,318 | Goldsmith | Jan. 11, 1938 |
| 2,611,618 | Camras | Sept. 23, 1952 |
| 2,777,901 | Dostert | Jan. 15, 1957 |
| 2,797,264 | Blaney | June 25, 1957 |

FOREIGN PATENTS

| | | |
|---|---|---|
| 699,779 | France | Dec. 17, 1930 |

OTHER REFERENCES

"Elements of Sound Recording," Frayne and Wolfe, published John Wiley and Sons, New York, 1949, p. 505.